Sept. 30, 1969                J. P. GALLAGHER                3,469,526
        AIR AND VACUUM CONTROL MECHANISM FOR A DUPLICATING MACHINE
Filed Sept. 22, 1966                                    2 Sheets-Sheet 1

INVENTOR
JOHN P. GALLAGHER

BY Diggins & O'Boyle
ATTORNEY

United States Patent Office 3,469,526
Patented Sept. 30, 1969

3,469,526
AIR AND VACUUM CONTROL MECHANISM FOR A DUPLICATING MACHINE
John P. Gallagher, Park Ridge, Ill., assignor to A. B. Dick Company, Chicago, Ill., a corporation of Illinois
Filed Sept. 22, 1966, Ser. No. 581,209
Int. Cl. B41f 9/00, 13/24; B65h 5/22
U.S. Cl. 101—142                              13 Claims

ABSTRACT OF THE DISCLOSURE

The air and vacuum control mechanism is adapted to provide both air under pressure and vacuum for a duplicating machine. A single control unit having two separated internal compartments, one for vacuum and one for air under pressure, is connected to both the inlet and outlet of an air pumping unit so that one compartment receives vacuum from the inlet while the remaining compartment receives air under pressure from the outlet. This control mechanism then selectively provides either air, vacuum, or both to a blanket cylinder drying unit and a sheet pickup unit for the duplicating machine.

---

This invention relates to fluid control systems generally and more specifically to a novel and improved air and vacuum control mechanism and system particularly adapted for use as a component of an offset duplicating machine.

The trend toward the automation of offset duplicating equipment has resulted in the development of electrical and mechanical control systems for programming an offset duplicator through the numerous steps required to complete an offset printing cycle. The goal of such automation is to eliminate a maximum number of manual steps which require the attention of a skilled operator and to facilitate rapid and effective offset printing with a minimal manual control requirement.

Early automation control systems for offset duplicators were designed to control the conventional components of existing equipment, and the extent to which automation could be achieved with these systems was severely limited by size and space requirements. The conversion of each individual component of conventional offset duplicator to automotive operation by providing such component with an individual control unit results on a confusion of control components which are difficult to combine into a coordinated central control system and which, when attached to an offset machine, leave little or no space for the accomplishment of normal duplicating functions. Therefore, early automation systems were designed to control only the primary components and functions of an offset machine and manual control remained as a necessary factor.

It has become an important feature in the development of fully automated offset equipment to provide improved controlled components for performing the steps in a duplicating cycle which are compact but are adapted to perform a maximum number of functions during a short operating period. Ideally, such components should be capable of accomplishing several diverse functions under the control of a single control element. The vacuum and air control mechanism of the present invention has been designed to meet this criteria.

Basically, the present invention involves the utilization of a low pressure air and vacuum system similar to those which have previously been employed in conventional offset duplicators to operate both a sheet feeding mechanism and to accomplish blanket cylinder drying. The novel system of the present invention effectively accomplishes both functions in response to a single control mechanism which may be operated by a central programming mechanism for an automated offset duplicator.

A primary object of this invention is to provide a novel and improved air and vacuum system especially adapted for use in automated offset duplicators;

Another object of this invention is to provide a novel and improved air and vacuum system adapted to switch between selective modes of operation in response to the operation of a single control element;

A further object of this invention is to provide a novel and improved air and vacuum system for offset duplicators operative in response to a single control component within the system to selectively air dry the blanket cylinder of the duplicator or provide air and vacuum for sheet feeding;

Another object of this invention is to provide a novel and improved air and vacuum system which includes an automatic lubricating and sealing feature for system control components;

A further object of this invention is to provide a novel and improved low pressure solenoid control valve for use in a fluid system.

Another object of this invention is to provide a novel and improved air and vacuum sheet pickup and blanket cylinder drying system for offset duplicating machines;

A still further object of this invention is to provide an economical, compact air and vacuum system incorporating a simple control mechanism which may be effectively incorporated in a programmed control system for an offset duplicating machine.

With the foregoing and other objects in view, the invention resides in the following specification and appended claims, certain embodiments and details of construction of which are illustrated in the accompanying drawings in which:

Figure 1:
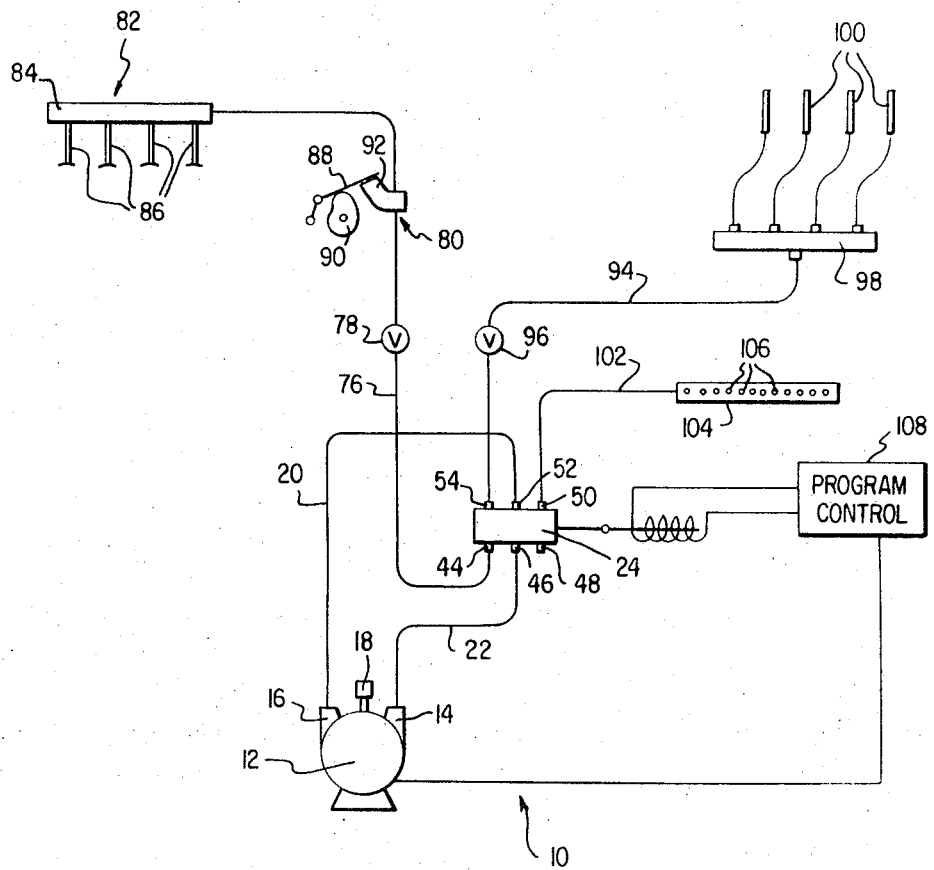
FIGURE 1 is a diagramatic illustration of the air and vacuum system of the present invention.

Referring now to the drawings, the air and vacuum system of the present invention indicated generally at 10 in FIGURE 1 includes a compressor 12 having an inlet or suction port 14 and a discharge or pressure port 16. A container 18 for oil or a similar liquid lubricant is secured to the casing of the compressor and, during compressor operation, is adapted to permit a small volume of lubricant to be drawn into the compressor through an opening (not shown) in the casing thereof. This lubricant contacts and lubricates the compressor blades, and excess lubricant is transformed into a mist which passes out through the pressure port 16. This lubricant mist performs a sealing and lubricating function to be hereinafter described.

Figure 2:
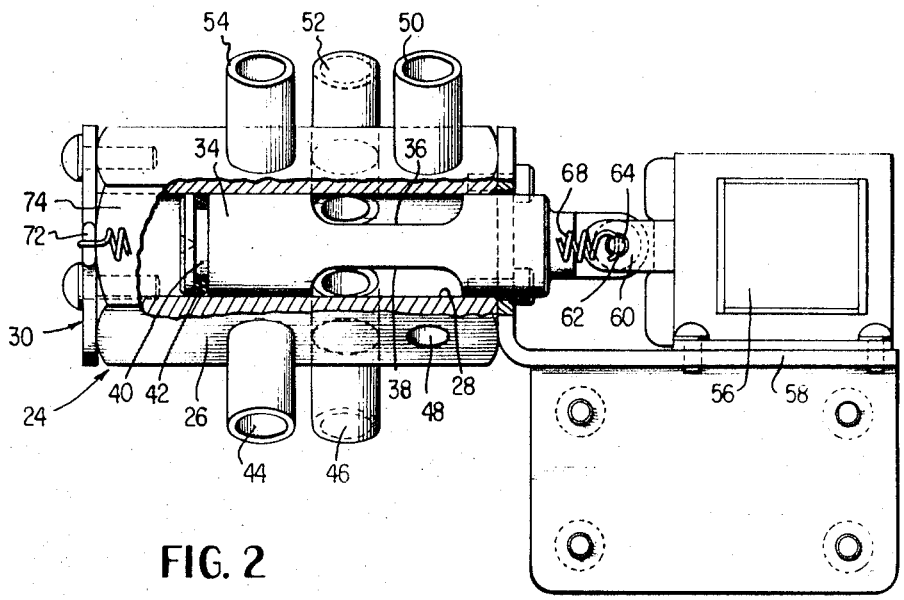
FIGURE 2 is a partially sectioned view in side elevation of the solenoid operated shuttle control valve of the present invention.
Figure 3:
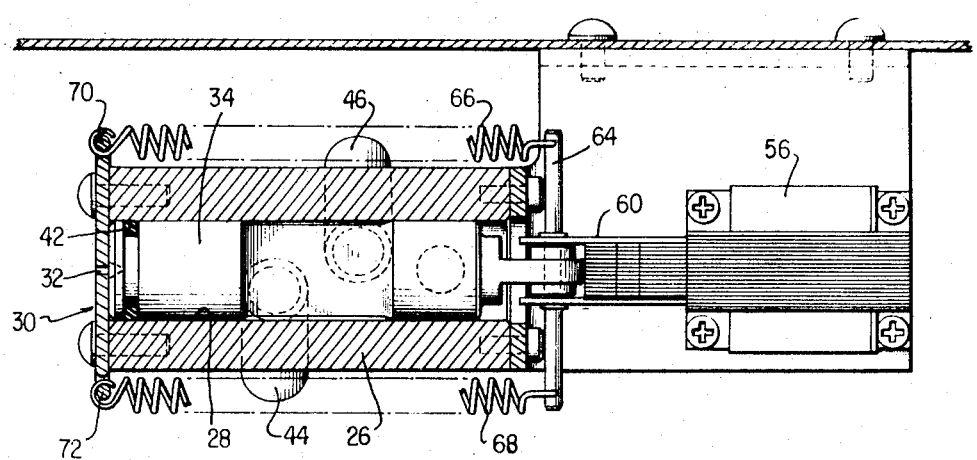
FIGURE 3 is a partially sectioned plan view of the shuttle control valve of FIGURE 2.

The pressure and suction ports of the compressor 12 are directly connected by means of lines 20 and 22 to a solenoid operated shuttle control valve 24 which forms the primary control element for the system 10. The construction of this shuttle control valve may best be understood by reference to FIGURES 2 and 3, wherein it may be noted that the valve includes a housing 26 which encloses a central valve chamber 28. One end of this valve housing is closed by a cap 30 which is provided with a small opening 32 extending from the exterior of the valve housing through the cap to the valve chamber 28.

The end of the valve housing opposite the cap 30 is open to permit a flow switching member in the form of a piston 34 to be insertted within the central valve chamber 28. Basically, the piston 34 is formed with an outside diameter which permits the outer surfaces of the piston to contact the inner surfaces of the central valve chamber. However, the outer surface of the piston is cut away inwardly of the ends thereof to form cut-away portions 36 and 38. These cutaway portions do not extend annularly around the outer periphery of the piston 34, but instead are separated from one another. With the piston in place within the central valve chamber 28, contact between the outer surface of the piston and the inner surface of the central valve chamber causes the cutaway portions 36 and 38 to form two separate compartments. Thus, it is apparent that the piston 34 differs in construction from the sliding pistons employed in convenitonal spool valves wherein annular passages are formed which extend completely around the surface of the valve piston.

An annular groove 40 is formed in the piston 34 adjacent the inner end thereof, and a sealing gasket 42 is received within this annular groove. The sealing gasket 42 is in the form of an O-ring and seals the piston against the inner wall of the central valve chamber 28.

Spaced along opposite sides of the valve housing 26 are six valve ports 44, 46, 48, 50, 52, and 54 which extend through the housing to the central valve chamber. The central port 46 on one side of the valve housing is connected by means of the line 22 to the suction port 14 of the compressor 12, while the central port 52 on the opposite side of the valve housing is connected by means of the line 20 to the pressure port 16 of the compressor. The central port 46 is aligned with the cutaway portion 38 of the piston 34 in all positions of the piston, while similarly the central port 52 is always aligned with the cutaway portion 36. Thus, the ports 46 and 52 constitute primary valve ports which are always open, while the ports 44, 48, 50 and 54, constitute secondary valve ports.

It is apparent that the central valve chamber 28 is longitudinally divided by the piston 34 to form a vacuum compartment with ports 44, 46 and 48 and a pressure or air compartment with ports 50, 52 and 54. The piston 34 prevents communication within the central chamber between the vacuum and the pressure or air sides of the chamber.

As the piton 34 slides within the central chamber 28, it selectively connects the central pressure port 52 with either the port 50 or the port 54, and simultaneously the central vacuum port 46 is selectively connected with either the vacuum port 48 or the port 44. However, it is important to note that for all positions of the piston 34, the pressure side of the central valve chamber is sealed from the vacuum side.

The shuttle control valve 24 is operated by a conventional electric solenoid 56 which is mounted upon a solenoid mount 58 connected to the valve housing 26. The plunger 60 of the solenoid 56 is connected at 62 to the outer end of the valve piston 34 so that upon actuation of the solenoid, the piston is drawn outwardly toward the solenoid so that flow occurs between the air valve ports 50 and 52 and the vacuum valve ports 46 and 48.

The connection between the solenoid plunger 60 and the valve piston 34 at 62 is accomplished by means of a bar 64 which extends through the plunger and piston and outward laterally from either side thereof. One end of the bar 64 is connected to one end of a spring 66 while the opposite end of the bar is connected to one end of a spring 68. These springs extend along the side of the valve housing 26. The ends of the springs 66 and 68 opposite the bar 64 are connected to spring mounts 70 and 72 which are provided on the housing 26 adjacent the end cap 30.

With the solenoid 56 de-energized, the springs 66 and 68 operate to move the piston 34 away from the solenoid into the central valve chamber 28. In this position, the piston closes the valve ports 48 and 50 and connects the central air port 52 to the air port 54 while simultaneously connecting the central vacuum port 46 to the vacuum port 44. The piston is prevented from slamming against the end cap 30 by the action of air trapped in the central valve chamber between the inner end of the piston and the end cap. The sealing gasket 42 prevents this trapped air from passing along the outer periphery of the piston as the piston moves into the central chamber 28, and thus, the inner end of the central chamber indicated at 74 forms a dampening chamber for the piston. As the piston moves inwardly of the central chamber, the air trapped in the dampening chamber 74 is slowly exhausted through the opening 32, to form a cushion for the piston conversely, when the solenoid is energized, a vacuum is created in the dampening chamber 74 which checks the forward motion of the piston 34 and prevents the solenoid plunger 60 from slamming against the solenoid 56.

The sealing gasket 42 may be eliminated when the fit between the piston 34 and control chamber 28 is held to a close tolerance.

The novel construction of the solenoid operated shuttle control valve 24 permits the valve to operate effectively to simultaneously control both vacuum and pressure. The longitudinal division of the central valve chamber 28 by the piston 34 into separate vacuum and pressure compartments enables the piston to slide freely in response to the solenoid 56. This free movement of the piston might not occur if a conventional spool valve were employed in place of the shuttle control valve 24, for the vacuum and pressure present in the annular passages of the spool valve could combine to operate against the action of the solenoid 56 to maintain the piston within the valve chamber.

The shuttle valve 24, when connected within the system 10 of the present invention, is automatically lubricated and sealed by the lubricant from the container 18. As previously stated, this lubricant is fed into the compressor 12 and is converted to a mist by the compressor blades. This lubricant mist then passes outwardly from the compressor 12 along the pressure line 20 and into the shuttle control valve 24 through the port 52. The lubricant mist entering the central valve chamber 28 of the shuttle control valve is disbursed between the surface of the piston 34 and the surfaces of the central valve chamber to provide both a lubricant and a seal for the piston. The action of the vacuum present in the cutaway section 38 of the piston tends to draw the lubricant around the outer surface of the piston, and any excess lubricant which might occur is then drawn out through the central port 46 and passed back to the compressor 12.

Returning to FIGURE 1, the vacuum port 44 of the shuttle control valve 24 is connected by means of a line 76, a vacuum control valve 78, and a vacuum break valve 80 to a sheet feeding assembly 82. The vacuum control valve 78 may constitute any conventional valve, such as a needle valve or three way valve, for selectively varying the degree to which the line 76 is vented to atmosphere. The setting of the control valve 78 therefore will control the vacuum pressure within the sheet feeding assembly 82.

The vacuum break valve 80 operates in combination with the sheet feeding assembly 82 to remove single copy sheets from a sheet storage supply. For illustrative purposes, the air and vacuum system 10 of the present invention may be used with a sheet feeding assembly 82 which is of the type illustrated in U.S. Patent No. 2,942,877 to W. R. Fowlie et al., but other feeding assemblies conventionally employed in offset printing presses could be substituted therefor. The sheet feeding assembly includes a header tube assembly 84 which is connected to the vacuum line 76 and a plurality of sucker tubes 86. When a vacuum exists in the line 76 to the header tube assembly 84, the sucker tube 86 will hold a single sheet of paper. However, when the vacuum between the control valve 78 and the header tube assembly 84 is broken by the vacuum break valve 80, the sucker tubes 86 will release the copy sheet previously held thereby.

The vaccum break valve 80 may be formed by a simple flapper valve having a flapper 88 which may be operated by a cam 90 or any similar operating mechanism. The flapper 88 covers an opening 92 in the valve 80, and when the flapper is in place to cover the opening 92, a vacuum exists in the line 76. However, when the flapper is moved away from the opening 92, the line 76 is vented to atmosphere and no vacuum is present in the line.

The remaining vacuum port 48 in the shuttle control valve 24 is not connected to a line or conduit, but opens directly to atmosphere. This port performs a function to be subsequently described.

Turning now to the air or pressure side of the shuttle control valve 24, it will be noted that the valve port 54 is connected by means of a line 94 through a pressure control valve 96 to a paper blower assembly 98 which may form part of the sheet feeding assembly 82. The air pressure control valve 96 may be identical in construction to the vacuum pressure control valve 78, and operates similarly to selectively control the venting of the line 94 to atmosphere. This in turn controls the amount of pressure present in the blower assembly 98.

The paper blower assembly 98 is of a type conventionally employed in offset duplicating machines, and operates to direct streams of air against the edges of copy sheets in a supply container so that these sheets will be separated for pick-up by the sucker tubes of the sheet feeder assembly 82. The paper blower assembly includes a plurality of finger tubes 100 which direct separate streams of air against the edges of a stack of copy sheets.

The last remaining air pressure valve port 50 in the shuttle valve 24 is directly connected by means of a line 102 to a drying tube 104. The drying tube 104 includes a plurality of air outlet terminals 106 which direct streams of air against the blanket cylinder of an offset duplicating machine. The drying tube is normally mounted adjacent the blanket cylinder of the offset press so that effective blanket cylinder drying will be accomplished when air pressure is fed to the drying tube through the line 102.

The operation of the air and vacuum system 10 of the present invention may be controlled by a programming unit 108 which may constitute any of a number of programming units employed to control the operation of an automated offset press. Such programming units generally include electrical or mechanical counting or step switching systems which operate in response to cylinder rotation, sheet count, or some other suitable operational function of the duplicating machine. These systems sequentially provide electrical power to automated machine components to activate these components at a precise point in the operational cycle of the duplicating machine. Both the operation of the compressor 12 and the energization of the solenoid 56 might be made responsive to such a programming unit, although both the compressor and the solenoid could also be made responsive to a manual control unit if such is desirable.

For normal operation of the air and vacuum system 10, the solenoid 56 is initially de-energized, and the springs 66 and 68 of the shuttle control valve 24 maintain the piston 34 in a position within the central valve chamber 28 to block the valve ports 48 and 50 and connect the valve ports 52 and 54 and 46 and 44. Thus, when the compressor 12 is rendered operative and the sheet feeding cycle of the offset duplicating press is initiated by the programming unit 108 or by other suitable manual means, the compressor draws air inwardly through the sucker tubes 86 of the sheet pick-up mechanism 82 and down through the vacuum break valve 80, the vacuum pressure control valve 78, and the vacuum ports 44 and 46 of the shuttle control valve 24 to the suction port 14 of the compressor. Simultaneously, exhaust air pressure is pumped by the compressor outwardly through the pressure port 16 through the line 20, the pressure ports 52 and 54 of the shuttle control valve 24, and then through the line 94 and air pressure control valve 96 to the paper blower assembly 98 and the finger tubes 100.

Thus, simultaneous vacuum and air pressure are provided for sheet feeding within an offset press.

Upon termination of the duplicating phase of operation of the offset duplicating machine, sheet feeding is terminated, and the blanket cylinder of the machine must be cleaned before a subsequent duplicating phase is initiated. It is beneficial to also accomplish blanket cylinder drying before the subsequent duplicating phase of the machine is begun, and for this purpose, the solenoid 56 is energized. This causes the piston 34 of the shuttle control valve 24 to move to the right in FIGURE 2 closing the valve ports 54 and 44 and connecting the valve port 52 to the valve port 50 while simultaneously connecting the valve port 46 to the valve port 48.

With the piston 34 of the shuttle valve in this position, the compressor 12 draws air directly from atmosphere through the valve ports 48 and 46 and the line 22 to the suction port 14. Similarly air under pressure is pumped directly from the compressor 12 through the pressure port 16, the line 20, the valve ports 52 and 50 and the line 102 to the blanket drying tube 104. It is important to note that for blanket drying, the shuttle control valve 24 permits air to be drawn directly from atmosphere and all system fittings which might tend to decrease the air pressure in the system, as for example, the vacuum break valve 80 and the vacuum and air pressure control valves 78 and 96, are bypassed. This permits the compressor 12 to develop and feed maximum air pressure to the blanket drying tube 104 so that rapid blanket drying may be accomplished.

It will be evident from a consideration of the foregoing description that this invention provides a simple and compact air and vacuum system having a novel and effective central control valve which is particularly adapted for use with a program controlled offset duplicating machine. The arrangement and types of components utilized within this invention may be subject to numerous modifications well within the perview of this inventor who intends only to be limited to a liberal interpretation of the specification and appended claims.

I claim:

1. In a duplicating machine having a blanket cylinder, a blanket cylinder drying unit for air drying said blanket cylinder and a sheet feeding assembly for feeding copy sheets from a storage stack during the duplication cycle of the machine, said sheet feeding assembly including sheet feeding means, sheet separating means, and vacuum operated sheet pick-up means for removing single copy sheets from said storage stack, moving each sheet to said sheet feeding means and returning to sheet pick-up position, an air and vacuum comprising an air pump having an air suction inlet and an air outlet for supplying air under pressure, valve means connected between said air inlet and said sheet pick-up means, between said outlet and said sheet separating means, and between said outlet and said blanket cylinder drying unit, said valve means being selectively operative to connect said sheet pick-up means of said sheet feeding assembly to said air inlet and said sheet separating means to said outlet during the duplicating cycle of said machine or to disconnect said inlet and said outlet from said sheet pick-up means and said sheet separating means and connect said blanket cylinder drying unit to said air outlet and said air inlet to the atmosphere between duplicating cycles of said machine.

2. The air and vacuum system of claim 1 including valve means between the air inlet and the sheet pick-up means for releasing the vacuum at said sheet pick-up means and means for actuating said valve means after each sheet is moved by said pick-up means and before the next sheet is picked up.

3. The air and vacuum system of claim 1 wherein said valve means is operative to connect the air inlet of said pumping means directly to atmosphere when said blanket cylinder drying unit is connected to said air outlet.

4. The air and vacuum system of claim 1 wherein said valve means is a multiport switching valve.

5. The air and vacuum system of claim 4 wherein said multiport switching valve is a two position, solenoid operated valve.

6. The air and vacuum system of claim 1 wherein said valve means includes a multiport shuttle control valve including a hollow valve housing formed to define an internal fluid chamber, fluid switching means axially slidable within said fluid chamber to at least two fluid switching positions, said fluid switching means being formed to define first and second separated fluid compartments within said fluid chamber, a primary valve port for each of said fluid compartments positioned on said valve housing to open into said fluid compartment for all switching positions of said fluid switching means, the primary valve port of said first fluid compartment being connected to the inlet of said pumping means while the primary valve port of said second fluid compartment is connected to the outlet of said pumping means, a first pair of secondary valve ports opening into said first fluid compartment, one of said first pair of secondary valve ports being connected to said sheet pick-up means and the other being open to the atmosphere and a second pair of secondary valve ports opening into said second fluid compartment, one of said second pair of secondary valve ports being connected to said sheet separating means and the other being connected to said blanket drying means and means for moving the fluid switching means to one position wherein the secondary valve port connected to the sheet separating means and the secondary valve port connected to the sheet pick-up means are open and the other two secondary valve ports are closed, and to a second position wherein the secondary valve port connected to the blanket drying means and the secondary valve port open to the atmosphere are open and the other secondary valve ports are closed.

7. The air and vacuum system of claim 6 wherein said valve means includes connecting means operable to connect said sheet pick-up means to a first secondary valve port opening into said first fluid compartment, said blanket cylinder drying unit to a second secondary valve port opening into said second fluid compartment, and said sheet pickup means to a third secondary valve port opening into said second fluid compartment, a fourth secondary valve port being provided on said valve, housing to connect said first fluid compartment to atmosphere.

8. The air and vacuum system of claim 1 wherein liquid lubricant dispensing means is provided upon said air pumping means to inject liquid lubricant into said pumping means, said pumping means operating to introduce liquid lubricant into the air under pressure passing from said outlet to said shuttle control valve.

9. The air and vacuum system of claim 6 wherein the first and second separated fluid compartments extend longitudinally within said fluid chamber.

10. The air and vacuum system of claim 9 which includes a solenoid control unit operatively connected to said fluid switching means to move said fluid switching means in one direction relative to said valve housing and biasing means connected to said fluid switching means to bias said fluid switching means in a direction opposite to the direction of movement thereof by said solenoid unit.

11. The air and vacuum system of claim 10 wherein said internal fluid chamber includes an open end and a closed end, said closed end being provided with a restricted pressure exhaust opening extending through said housing and said fluid switching means composing substantially cylindrical piston means having an inner end, an outer end, and a circumferential surface in contact with the wall of said fluid chamber, the inner end of said piston means being formed to provide a closed, two way piston dampening chamber between said piston means and the closed end of said fluid chamber.

12. The air and vacuum system of claim 11 wherein symmetrical opposed cutaway sections are formed in the circumferential surface of said piston means, said cutaway sections forming said first and second separated fluid compartments when the circumferential surface of said piston means is in contact with the wall of said fluid chamber.

13. The air and vacuum system of claim 12 wherein sealing means are mounted upon the inner end of said piston means, said sealing means operating to form a substantially air tight seal between said piston means and said valve housing.

References Cited

UNITED STATES PATENTS

| | | | |
|---|---|---|---|
| 2,766,718 | 10/1956 | Ball | 118—46 |
| 2,884,855 | 5/1959 | Koch | 101—142 |
| 2,942,877 | 6/1960 | Fowlie et al. | 271—31 |
| 3,097,599 | 7/1963 | Rutishauser | 101—416 |
| 3,226,107 | 12/1965 | Staines | 271—27 |
| 3,254,675 | 6/1966 | Johnson | 137—625.65 |

ROBERT E. PULFREY, Primary Examiner

J. REED FISHER, Assistant Examiner

U.S. Cl. X.R.

101—232, 416; 137—625.65; 271—5